K. F. LEES.
COMBINED TIRE TEST GAGE AND VALVE.
APPLICATION FILED OCT. 16, 1919.

1,368,511. Patented Feb. 15, 1921.

Inventor:
Kenneth F. Lees,
by C. A. Mason, Atty.

UNITED STATES PATENT OFFICE.

KENNETH F. LEES, OF NEW HAVEN, CONNECTICUT.

COMBINED TIRE TEST-GAGE AND VALVE.

1,368,511.   Specification of Letters Patent.   Patented Feb. 15, 1921.

Application filed October 16, 1919. Serial No. 331,235.

*To all whom it may concern:*

Be it known that I, KENNETH F. LEES, a citizen of the United States, residing at New Haven, in the county of New Haven and State of Connecticut, have invented certain new and useful Improvements in Combined Tire Test-Gages and Valves, of which the following is a full, clear, and exact description.

This invention relates to a combined pressure gage and air valve for use on pneumatic tires. More particularly, it relates to a tire pressure test gage of a character which is designed to be permanently attached to the valve stem or tube of a pneumatic tire, and a valve which is positively operated for controlling the air passage in the air valve tube or stem.

In my prior application Serial No. 273,615, filed January 28, 1919, now Patent 1,328,572, patented Jan. 20, 1920, I have shown, described and claimed a tire test gage designed to be permanently attached to the air valve of each tire of a vehicle, the tire air pressure indicating means which is so adjusted as to be movable only upon excess of the amount of pressure which is calculated as the minimum safety pressure for the tire. The present improvements are especially useful in connection with such type of pressure gage, although it is to be understood that the invention is useful with pressure gages generally, and is not confined to those of the type shown in said application.

A very important feature of the present invention is comprised in a needle valve, which is positively operated, and seats upon a valve seat in the usual air valve stem. Such form of valve is especially desirable in connection with tires used upon trucks or other heavy vehicles where the air pressures are excessively high as compared with those of the tires in pleasure vehicles. It has been found in practice that the ordinary spring seated check valve will not stand up under the heavy pressures employed in the tires of trucks or heavy vehicles, and hence a positively operated valve is essential in these tires.

Under the present invention, the positively operated air valve is in the form of a floating needle valve, and has connection with its manually operable stem by a ball and socket, or other universal joint, thus permitting of a positive seating of the valve in an air-tight manner, even if the stem is slightly out of alinement with the seat, as the valve is self-adjusting.

The needle valve is constructed with two opposite seating faces, preferably of conical form, one of said faces being designed to seat upon a tire valve stem for confining the air within the tire, and the other of said faces being adapted to exclude the air from the plunger of the test gage, during the inflation of the tire. The device is provided at a point intermediate of the two valve seats with a tire inflation connection, or nipple designed for coupling with an air pump or other source of air under pressure. An advantageous result which follows from the employment of a double needle valve, in the relation described, is that it may be employed when in its upper position to seal the tire test gage plunger against air pressure while the tire is being inflated, and in its lower position will seal the tire valve stem against the escape of air pressure from the tire, and in its intermediate position will permit the air under pressure to have access to the plunger of the gage, in order to test the pressure within the tire.

The above, and other important features of the invention, will be better understood from the following description, and will be more particularly pointed out in the claims.

In the drawings:—

Figure 1:
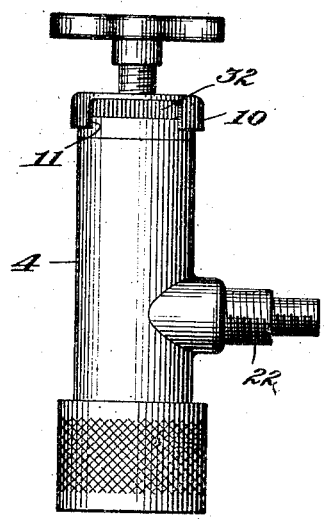
Figure 1 represents, in side elevation, a combined tire test gage and valve embodying the present invention.
Figure 2:
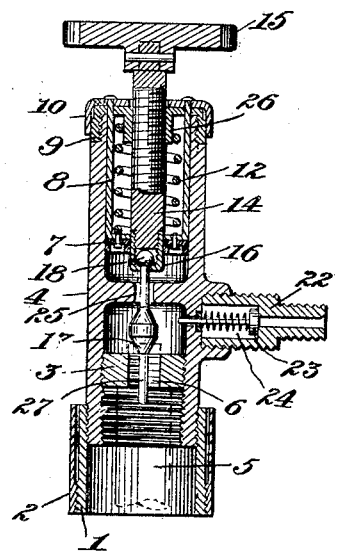
Fig. 2 is a vertical longitudinal section of the same.
Figure 3:
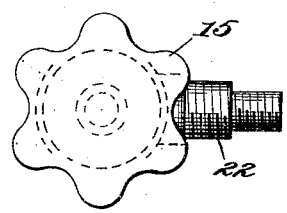
Fig. 3 is a plan view.

An inner sleeve 1 is provided at its upper portion with an internal thread to engage an external thread upon the lower end portion of the casing 4, and said sleeve is provided near its lower portion with threads which engage internal threads upon an outer adjustable sleeve 2. The casing 4 is threaded interiorly to receive an adjustable plug 3, provided with a central bore which is in threaded engagement with the upper reduced end portion 6 of a pneumatic tire valve stem 5, which may be of the usual construction. The upper portion of the casing 4 is bored and finished interiorly to form a cylinder which receives in an air-tight manner a plunger 7, having a cupped packing as shown. The upper end of the casing 4 is threaded externally to receive a closing cap 9, provided with an internal thread to engage the external thread of the casing, and having an interior depending internally threaded sleeve portion 26. An operating stem 14, which is provided with external threads engaging the threaded extension 26, has at its upper end an operating hand wheel 15. The lower end of the stem has threaded thereto a cap 16, there being a cavity or space between the inside of said cap and the end of the stem which forms a socket or receiving chamber for a ball 18, connected by a short stem with a double-faced needle valve 17, which is provided at its lower end with a guiding stem or rod 27 which extends down into the open end portion of the tire air valve tube or stem 5. The valve 17, which may be regarded as a needle valve, is constructed with two oppositely facing conical faces, and by reason of the fact that said valve is connected with the stem 14 by a ball and socket joint, the valve is rendered "floating" or self-adjustable to its seats, regardless of variations in alinement between the stem 14 and said seats.

The valve 17, being of the floating variety, and positively operated, is especially valuable in sealing effectually the air valve stem against the escape of air under high pressure within the tire, and such valve has been found to be far superior, both as to durability and effectiveness, to the ordinary spring held check valve, where the tires contain air under heavy pressures, as in the case of trucks and other vehicles of that type.

Extending upwardly along the inside wall of the plunger cylinder formed in casing 4 are two or more guide rods 8, the upper ends of said rods being riveted or otherwise rigidly secured to a test cap 10, which has a depending flange sliding snugly over the fixed cap 9. Preferably, portions of the cap 10 are cut away, as indicated at 11, Fig. 1, to expose any suitable indicating means upon the fixed cap 9, and in the present instance I have shown a colored band 32, which is preferably red, and as of a width which is less than the total width of the downwardly extending flange of the test cap 10. A gage spring 12 is confined between the plunger 7 and the inner wall of the cap 9, and such spring is so adjusted as to its tension that its strength will be sufficient to overcome any tire pressures which are below the minimum safety pressure of the tire. When such minimum safety pressure is exceeded, however, the pressure of the spring will be overcome and the plunger will rise, carrying with it the cap 10 which will slide over the cap 9 and indicate by such movement that the pressure of that particular tire is in excess of the minimum safety pressure. If the movement of the plunger is sufficient in extent to carry the lower edge of the cap 10 to the line marking the lower edge of the red band 32, it will indicate that the tire is over-inflated, and some of the air pressure may then be permitted to escape.

The casing 4 is provided on one side at a point intermediate the upper valve seat 25 and the lower valve seat 17 with a threaded boss which is engaged by a tire inflating nipple 32, having a valve seat upon which is seated a spring held valve 23, having a valve stem 24. This stem is guided through an aperture in a plug surrounding the opening between the interior of casing 4 and nipple 22. The nipple 22 provides means for effecting a connection with an air pump, or other source of air pressure, for inflating the tire in the usual way. As the air is admitted to the casing 4 during the inflation process at a point intermediate the two seats of the valve 17, it will be seen that when said valve is seated upon the seat 25, air may be admitted under pressure to the tire through the valve stem 5, until the desired amount of pressure has been obtained, and at the same time the valve 17 will prevent the pressure of the air used to inflate the tire from acting upon the tire test gage plunger 7. This is an important result as it materially increases the life of the test gage by eliminating excessive strains against the plunger spring when inflation is taking place, and it also keeps the indicating cap 10 in its normal position until a test of the tire pressure is desired. If at any time during the inflation of the tire it should be desired to make a test of the pressure in the latter, the valve 17 will simply be moved downwardly to an intermediate position, thereby opening communication between the air pressure within the tire and the plunger 7. After the test is completed, if it is desired to further inflate the tire, the valve 17 will be again raised and seated against the seat 25.

If at any time the operator of a vehicle desires to make a test of any of the tires to which the test gage is attached, he screws the hand wheel 15 to the left, thereby raising the needle valve 17 from its seat upon the tube 5. The moment the valve is raised, air is permitted to come in contact with the plunger of the test gage and if there is not sufficient air in the tire the indicating cap 10 will not move. The operator will then continue to rotate the handle 15 until the valve reaches the seat 25, thus sealing the chamber below the plunger and preventing the air from coming in contact with the latter. Connection of the nipple 23 with an inflating device will then be made and the tire will be inflated in the usual manner, and tests may be made of the air pressure whenever desired, by simply rotating the hand wheel 15 to the right so as to cause the valve 17 to move away from the seat 25. If the tire is found to be properly inflated following such test, the operator will simply continue to revolve the hand wheel to the right until the needle valve is seated in the tire valve stem 5, thus sealing the latter and preventing the escape of the air from the tire.

It is to be understood that changes may be made in the details of construction, or relative arrangements of the parts of the device as above described, without departing from the broad principles of the invention, provided such changes are within the scope of the following claims.

Having described the invention what is claimed is:

1. In a device of the class described, the combination with a gage arranged for connection with a tire air valve stem, of a positively-operated needle valve located outside of and arranged to seat upon the outer end of said stem for controlling communication between the tire and said gage.

2. In a device of the class described, an air pressure gage, including a spring-pressed plunger, means for connecting said gage to the air valve stem of a tire, and a positively-operated floating valve seating upon the open outer end of said stem for controlling communication between the tire and said plunger.

3. In a device of the class described, a casing, an air pressure gage having a spring-pressed plunger in said casing, means for connecting said casing with the air valve stem of a tire, a tire inflating connection with said casing, valve seats located on opposite sides of said connection, and a double-valve movable between said seats and arranged when in one position to seal the tire valve stem, and when in another position to prevent access of air under pressure to said plunger.

4. In a device of the class described, a casing arranged for connection with a tire air valve stem, an air pressure gage in said casing having a plunger, a tire inflating connection intermediate said stem and plunger, openings and valve seats in said casing and stem, and a positively operated valve located between said seats and adapted to engage one of said seats to confine the air to the tire and to engage the other of said seats for preventing access of the air under pressure to said plunger.

5. In a device of the class described, a casing arranged for connection with a tire air valve stem, an air pressure gage located permanently in said casing having a plunger, a tire inflating connection with said casing, openings and valve seats located between said connection and the tire valve stem and plunger, respectively, a floating double-faced valve located between said seats, and manually operable means for causing said valve to engage either of said seats, at will.

6. In a device of the class described, a casing arranged for connection with a tire air valve stem, an air pressure gage in said casing having a plunger, a tire inflating connection with said casing, openings and valve seats located between said connection and the valve stem, and plunger, respectively, a reciprocating valve stem, and a double-cone needle valve connected loosely with said stem and located between and adapted to be moved into engagement with either of said seats.

7. In a device of the class described, a casing arranged for connection with a tire air valve stem, an air pressure gage in said casing having a plunger, a tire inflating connection with said casing, openings and valve seats located between said connection and the valve stem, and plunger, respectively, a reciprocating valve stem extending through said plunger, and a double-faced needle valve loosely connected with said stem and adapted to be moved into engagement with either of said seats.

8. In a device of the class described, the combination with a casing for connection with the stem of a pneumatic tire, of a positively operated needle valve arranged to engage a seat at the outer open end of said stem, an operating stem for said valve, and a self-adjusting connection between said last-named stem and the valve.

9. In a device of the class described, the combination with a casing for connection with the stem of a pneumatic tire valve, of an air pressure test gage in said casing having a plunger and indicating means operated thereby, a stem reciprocating within said plunger, and a self-adjusting valve having a loose connection with said stem and adapted to a seat in the tire air valve stem.

10. In a device of the class described, the combination with a casing for connection with a pneumatic tire air valve stem, of a spring-pressed air gage plunger in said casing, a threaded valve stem movable axially through said plunger, a double-faced needle valve connected with said stem, an inflating connection with said casing, and openings and valve seats located on opposite sides of said connection, said seats arranged to be alternately engaged by said valve at will.

11. In a device of the class described, the combination with a casing to be connected with a pneumatic tire air valve stem, of a spring-pressed air gage plunger in said casing, a reciprocating valve stem operable through said plunger, a double-faced conical valve having a universal connection with said stem, openings and valve seats between said valve, and said plunger and tire valve stem, respectively, and a tire inflating nipple connected with said casing at a point intermediate said valve seats.

In testimony whereof I have hereunto set my hand this 15th day of October A. D. 1919.

KENNETH F. LEES.

Witnesses.
AGNES KENNEALLY,
HENRY O. KNOLL.